(12) United States Patent
Bhatia et al.

(10) Patent No.: US 11,494,289 B2
(45) Date of Patent: Nov. 8, 2022

(54) AUTOMATIC FRAMEWORK TO CREATE QA TEST PASS

(71) Applicant: American Megatrends International, LLC, Duluth, GA (US)

(72) Inventors: Anurag Bhatia, Lilburn, GA (US); Samvinesh Christopher, Suwanee, GA (US); Winston Thangapandian, Suwanee, GA (US); Utpal Patel, Suwanee, GA (US)

(73) Assignee: AMERICAN MEGATRENDS INTERNATIONAL, LLC, Duluth, GA (US)

( * ) Notice: Subject to any disclaimer, the term of this patent is extended or adjusted under 35 U.S.C. 154(b) by 0 days.

(21) Appl. No.: 16/259,470

(22) Filed: Jan. 28, 2019

(65) Prior Publication Data

US 2020/0242014 A1    Jul. 30, 2020

(51) Int. Cl.
G06F 11/36       (2006.01)
G06F 11/22       (2006.01)
G06F 11/263      (2006.01)
G06F 8/61        (2018.01)

(52) U.S. Cl.
CPC ............ *G06F 11/3684* (2013.01); *G06F 8/61* (2013.01); *G06F 11/2284* (2013.01); *G06F 11/263* (2013.01); *G06F 11/3664* (2013.01); *G06F 11/3688* (2013.01); *G06F 11/3692* (2013.01)

(58) Field of Classification Search
CPC ............ G06F 11/3648; G06F 11/3684; G06F 11/2284; G06F 11/263; G06F 11/3664; G06F 11/3688; G06F 11/3692; G06F 8/61

USPC .......................................................... 717/124
See application file for complete search history.

(56) References Cited

U.S. PATENT DOCUMENTS

| | | | | |
|---|---|---|---|---|
| 7,945,769 | B2* | 5/2011 | Hong ...................... | H05K 1/14 713/1 |
| 8,166,458 | B2* | 4/2012 | Li ........................... | G06F 9/5038 709/223 |
| 9,158,662 | B1* | 10/2015 | Hanes ................. | G06F 11/3664 |
| 10,498,625 | B1* | 12/2019 | Mozealous ............. | H04L 67/16 |
| 2002/0138510 | A1* | 9/2002 | Tan ......................... | G06F 17/21 715/206 |
| 2006/0037012 | A1* | 2/2006 | Zomaya .................... | G06F 8/64 717/168 |
| 2009/0112979 | A1* | 4/2009 | Millican ................... | G06F 8/70 709/203 |

(Continued)

*Primary Examiner* — Chat C Do
*Assistant Examiner* — Bradford F Wheaton
(74) *Attorney, Agent, or Firm* — Locke Lord LLP; Tim Tingkang Xia, Esq.

(57) ABSTRACT

In an aspect of the disclosure, a method, a computer-readable medium, and a device are provided. The device determines one or more feature components of firmware of a BMC to be tested. The device also determines a respective QA category from a plurality of QA categories for each of the one or more feature components. Each of the plurality of QA categories is associated with a set of feature components and a set of the test cases. The device further determines respective at least one test case for each of the one or more feature components based on the respective QA category of the each feature component. The test case specifies hardware and a procedure to be used to test the each feature component.

11 Claims, 6 Drawing Sheets

(56) References Cited

U.S. PATENT DOCUMENTS

2010/0138526 A1* 6/2010 DeHaan ............. H04L 41/0806
709/223

* cited by examiner

AUTOMATIC FRAMEWORK TO CREATE QA TEST PASS

BACKGROUND

Field

The present disclosure relates generally to computer systems, and more particularly, to techniques of testing firmware of a baseboard management controller (BMC) for quality assurance (QA).

Background

The statements in this section merely provide background information related to the present disclosure and may not constitute prior art.

Considerable developments have been made in the arena of server management. An industry standard called Intelligent Platform Management Interface (IPMI), described in, e.g., "IPMI: Intelligent Platform Management Interface Specification, Second Generation," v.2.0, Feb. 12, 2004, defines a protocol, requirements and guidelines for implementing a management solution for server-class computer systems. The features provided by the IPMI standard include power management, system event logging, environmental health monitoring using various sensors, watchdog timers, field replaceable unit information, in-band and out of band access to the management controller, SNMP traps, etc.

A component that is normally included in a server-class computer to implement the IPMI standard is known as a Baseboard Management Controller (BMC). A BMC is a specialized microcontroller embedded on the motherboard of the computer, which manages the interface between the system management software and the platform hardware. The BMC generally provides the "intelligence" in the IPMI architecture.

The BMC may be considered as an embedded-system device or a service processor. A BMC may require a firmware image to make them operational. "Firmware" is software that is stored in a read-only memory (ROM) (which may be reprogrammable), such as a ROM, programmable read-only memory (PROM), erasable programmable read-only memory (EPROM), electrically erasable programmable read-only memory (EEPROM), etc.

For a BMC firmware test build, QA personnel may need to select test cases manually in the corresponding test pass based on features enabled in the firmware. Therefore, there is a need for a mechanism that automatically generates QA test passes.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and a device are provided. The device determines one or more feature components of firmware of a BMC to be tested. The device also determines a respective QA category from a plurality of QA categories for each of the one or more feature components. Each of the plurality of QA categories is associated with a set of feature components and a set of the test cases. The device further determines respective at least one test case for each of the one or more feature components based on the respective QA category of the each feature component. The test case specifies hardware and a procedure to be used to test the each feature component.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
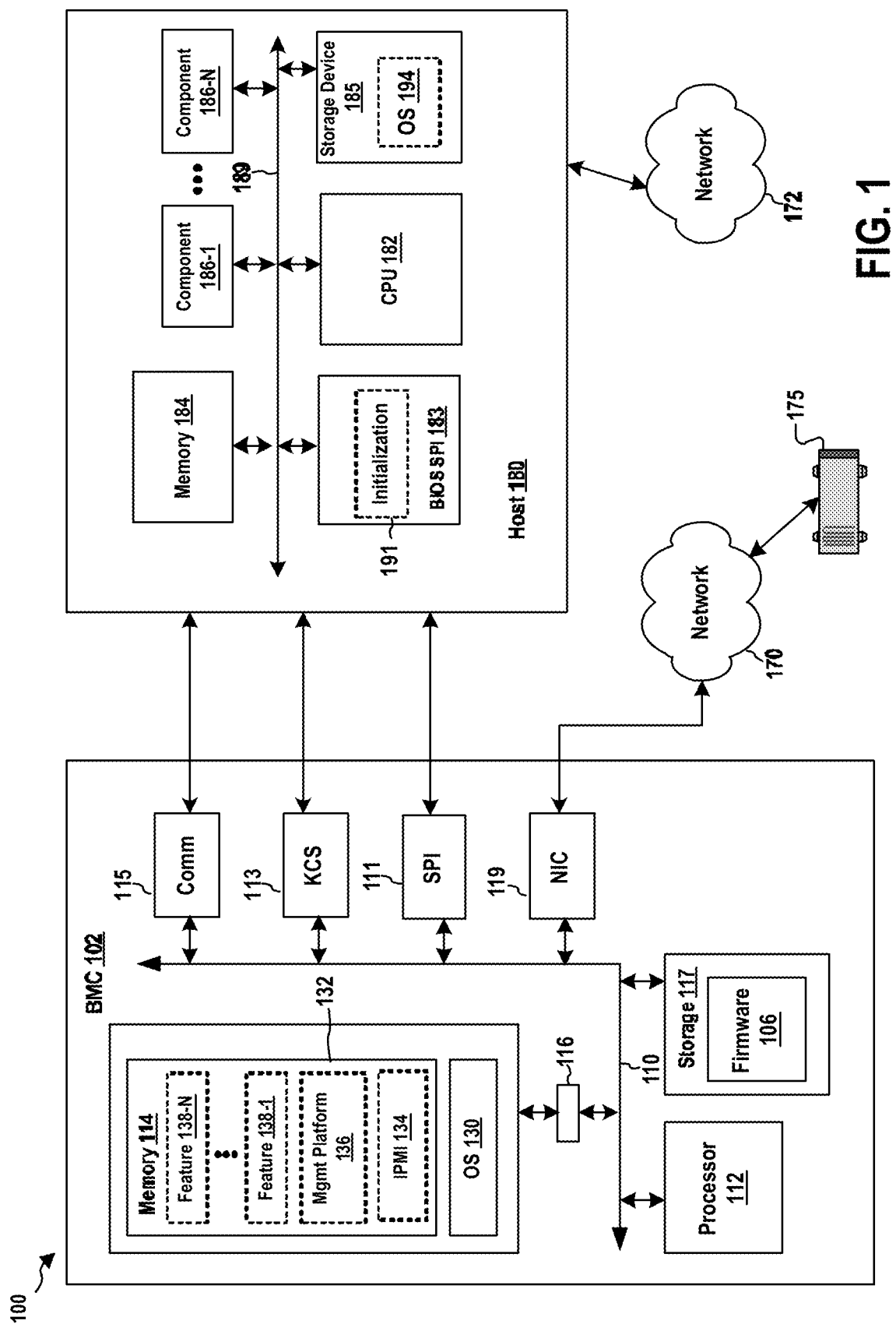
FIG. 1 is a diagram illustrating a computer system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of computer systems will now be presented with reference to various apparatus and methods. These apparatus and methods will be described in the following detailed description and illustrated in the accompanying drawings by various blocks, components, circuits, processes, algorithms, etc. (collectively referred to as elements). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a processing system that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

For a BMC firmware test build, QA personnel may need to select test cases manually in the corresponding test pass based on features enabled in the firmware. Therefore, there is a need for a mechanism that automatically generates QA test passes.

FIG. 1 is a diagram illustrating a computer system 100. In this example, the computer system includes, among other devices, a BMC 102 and a host computer 180. The BMC 102 has, among other components, a processing unit 112, a memory 114, a memory driver 116, a storage 117, a SPI interface 111 (Serial Peripheral Interface), a KCS interface 113 (Keyboard Controller Style), a network interface card 119, and other communication interfaces 115.

The communication interfaces 115 may include a Universal Serial Bus (USB) interface, a server management interface chip (SMIC) interface, a block transfer (BT) interface, a system management bus system interface (SSIF), and/or other suitable communication interface(s). Further, as described infra, the BMC 102 supports IPMI and provides an IPMI interface between the BMC 102 and the host computer 180. The IPMI interface may be implemented over one or more of the KCS interface 113, the network interface card 119, and the communication interfaces 115.

In certain configurations, one or more of the above components may be implemented as a system-on-a-chip (SoC). For examples, the processing unit 112, the memory 114, the memory driver 116, the storage 117, the network interface card 119, the KCS interface 113, the SPI interface 111, and/or the communication interfaces 115 may be on the same chip. In addition, those components may be in communication with each other through a communication channel 110 such as a bus architecture.

The BMC 102 may store BMC firmware 106 in the storage 117. The storage 117 may utilize a non-volatile, non-transitory storage media. When the processing unit 112 executes the BMC firmware 106, the processing unit 112 loads code and data of the BMC firmware 106 into the memory 114. In particular, the BMC firmware 106 can provide in the memory 114 an OS 130 (operating system) and service components 132. The service components 132 include, among other components, IPMI services 134, a management platform 136, and feature components 138-1 to 138-N. Further, the service components 132 may be implemented as a service stack. As such, the BMC firmware 106 can provide an embedded system to the BMC 102. In addition, the storage 117 may provide database(s) 107 that can be accessed by the IPMI services 134 or the management platform 136.

In one example, the management platform 136 may implements REDFISH specification, as defined in "Redfish Scalable Platforms Management API Specification Document Identifier: DSP0266 Date: Apr. 5, 2018 Version: 1.4.1," which is published by Distributed Management Task Force (DMTF) and is expressly incorporated by reference herein in its entirety.

The BMC 102 may be in communication with the host computer 180 through the KCS interface 113, the network interface card 119, the communication interfaces 115, the SPI interface 111, and/or the IPMI interface.

The host computer 180 includes a host CPU 182, a host memory 184, a storage device 185, an initialization storage device 183, and component devices 186-1 to 186-N that may be interconnected with each other through a host bus system 189. Further, the initialization storage device 183 may be a SPI device.

The component devices 186-1 to 186-N can be any suitable type of hardware components that are installed on the host computer 180, including additional CPUs, memories, and storage devices. As a further example, the component devices 186-1 to 186-N can also include Peripheral Component Interconnect Express (PCIe) devices, a redundant array of independent disks (RAID) controller, and/or a network controller. Further, the component devices 186-1 to 186-N can include hardware components of a computer 602 shown in FIG. 6.

In this example, after the host computer 180 is powered on, the host CPU 182 loads an initialization component 191 from the initialization storage device 183 into the host memory 184 and executes the initialization component 191. In one example, the initialization component 191 is a basic input/output system (BIOS). In another example, the initialization component 191 implements a Unified Extensible Firmware Interface (UEFI). UEFI is defined in, for example, "Unified Extensible Firmware Interface Specification Version 2.6, dated January, 2016," which is expressly incorporated by reference herein in their entirety. As such, the initialization component 191 may include one or more UEFI boot services.

The initialization component 191, among other things, performs hardware initialization during the booting process (power-on startup). For example, when the initialization component 191 is a BIOS, the initialization component 191 can perform a Power On System Test, or Power On Self Test, (POST). The POST is used to initialize the standard system components, such as system timers, system DMA (Direct Memory Access) controllers, system memory controllers, system I/O devices and video hardware (which are part of the component devices 186-1 to 186-N). As part of its initialization routine, the POST sets the default values for a table of interrupt vectors. These default values point to standard interrupt handlers in the memory 114 or a ROM. The POST also performs a reliability test to check that the system hardware, such as the memory and system timers, is functioning correctly. After system initialization and diagnostics, the POST surveys the system for firmware located on non-volatile memory on optional hardware cards (adapters) in the system. This is performed by scanning a specific address space for memory having a given signature. If the signature is found, the initialization component 191 then initializes the device on which it is located. When the initialization component 191 includes UEFI boot services, the initialization component 191 may also perform procedures similar to POST.

After the initialization is performed, the initialization component 191 can read a bootstrap loader from a predetermined location from a boot device of the storage device 185, usually a hard disk of the storage device 185, into the host memory 184, and passes control to the bootstrap loader. The bootstrap loader then loads an OS 194 into the host memory 184. If the OS 194 is properly loaded into memory, the bootstrap loader passes control to it. Subsequently, the OS 194 initializes and operates. Further, on certain disk-less, or media-less, workstations, the adapter firmware located on a network interface card re-routes the pointers used to bootstrap the operating system to download the operating system from an attached network.

The service components 132 of the BMC 102 may manage the host computer 180 and is responsible for managing and monitoring the server vitals such as temperature and voltage levels. The service stack can also facilitate administrators to remotely access and manage the host computer 180. In particular, the BMC 102, via the IPMI services 134, may manage the host computer 180 in accordance with IPMI. The service components 132 may receive and send IPMI messages to the host computer 180 through the IPMI interface.

Further, the host computer 180 may be connected to a data network 172. In one example, the host computer 180 may be a computer system in a data center. Through the data network 172, the host computer 180 may exchange data with other computer systems in the data center or exchange data with machines on the Internet.

The BMC 102 may be in communication with a communication network 170 (e.g., a local area network (LAN)). In this example, the BMC 102 may be in communication with the communication network 170 through the network interface card 119. Further, the communication network 170 may be isolated from the data network 172 and may be out-of-band to the data network 172. In certain configurations, the communication network 170 may not be connected to the Internet. In certain configurations, the communication network 170 may be in communication with the data network 172 and/or the Internet. In addition, through the communication network 170, a remote device 175 may communicate with the BMC 102. For example, the remote device 175 may send IPMI messages to the BMC 102 over the communication network 170.

Each of the feature components 138-1 to 138-N, alone or in combination with the IPMI services 134 and/or the management platform 136, may provide a particular functionality. The functionality may be for managing the components of the host computer 180. For example, the feature component 138-1 may update the firmware of the initialization storage device 183.

Figure 2:
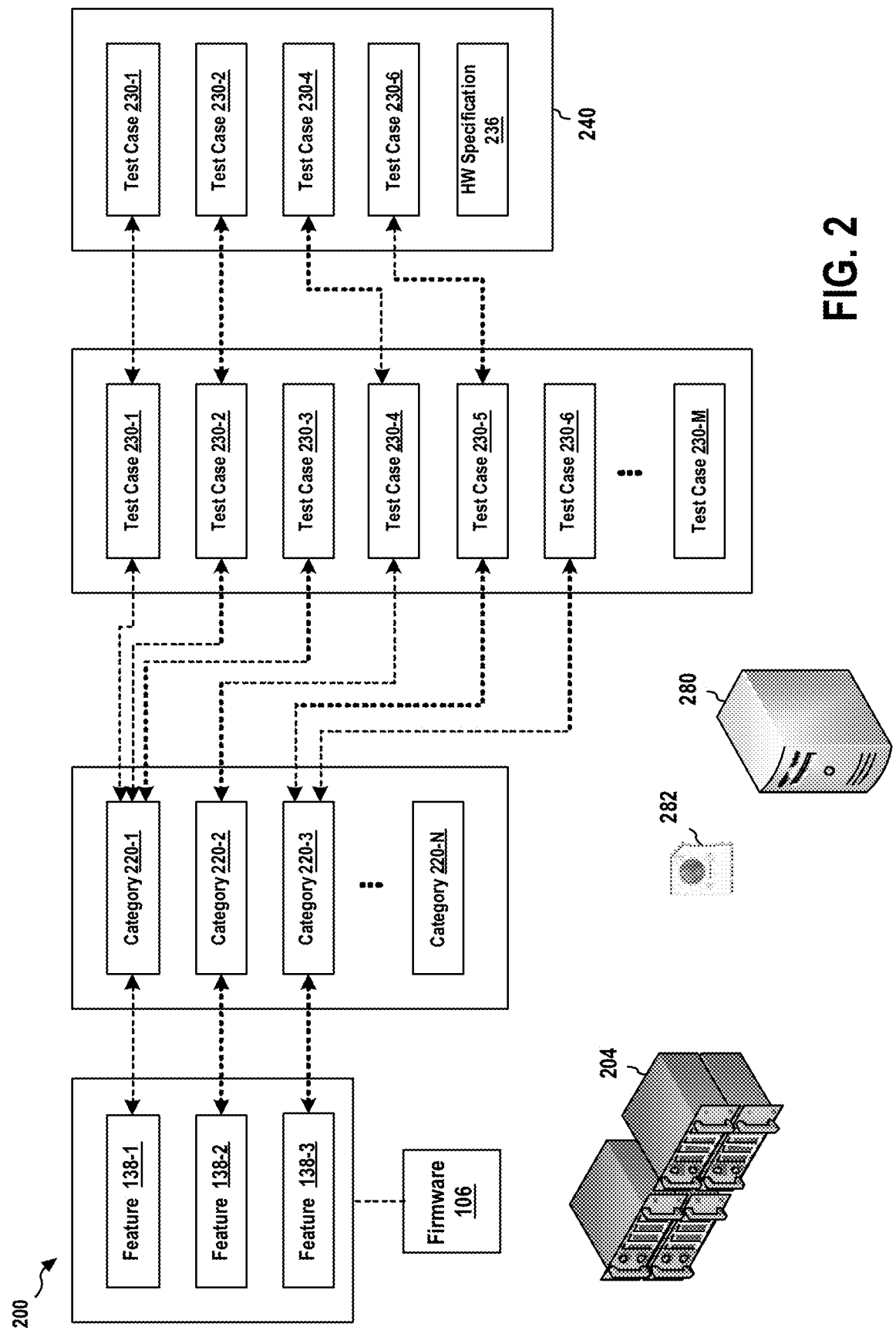
FIG. 2 is a diagram illustrating operations of a testing platform.

FIG. 2 is a diagram 200 illustrating operations of a testing platform 204. In certain circumstances, the BMC firmware 106 may be updated to include new features. Before being released to production, the updated BMC firmware 106 needs to be thoroughly tested. The testing platform 204 is configured to determine test cases to be used for testing the BMC firmware 106. A test case specifies particular procedures for running test on a test machine running the BMC firmware 106.

The testing platform 204 scans the BMC firmware 106 or a configuration file of the BMC firmware 106 to determine new feature components provided on the BMC firmware 106. As described supra, the BMC firmware 106 includes the feature components 138-1 to 138-N. The testing platform 204 may be supplied with information and configuration of a collection of feature components that are new and to be tested. Based on the scan, the testing platform 204 determines that the feature components 138-1 to 138-3 are new feature components and need to be tested.

The testing platform 204 holds information of QA categories 220-1 to 220-N, each of which is associated with multiple feature components. The testing platform 204 then determines the QA categories that are associated with the feature components 138-1 to 138-3. In this example, the feature components 138-1 to 138-3 are associated with QA categories 220-1 to 220-3, respectively.

Each of the QA categories 220-1 to 220-N is associated with one or more of test cases 230-1 to 230-M. In particular, a test case specifies the procedures and the hardware components required to run a particular test. Based on the specification of the test case, a tester (e.g., a person or a device) can load the firmware on a test machine having the required hardware components and execute the test procedures. In this example, the QA category 220-1 is associated with the test cases 230-1 to 230-3. The QA category 220-2 is associated with the test case 230-4. The QA category 220-3 is associated with the test cases 230-5 and 230-6.

The testing platform 204, based on the configurations, can select one or more of the associated test cases for each QA category and include the selected test cases in a test pass 240. Some test cases associated with a QA category may be variants to each other, and only one of those test cases is need in the test pass. In this example, the testing platform 204 selects the test cases 230-1 and 230-2 for the QA category 220-1, the test case 230-4 for the QA category 220-2, and the test case 230-6 for the QA category 220-3 for inclusion in the test pass 240.

In addition, based on hardware specification of the selected test cases in the test pass 240, the testing platform 204 can determine the hardware components requirements for running the test procedures specified in those test cases. As such, the testing platform 204 can determine a machine specification 236 of a test machine 280. The machine specification 236 can specify one or more hardware components of the BMC 102 and the host computer 180 required in the test machine 280 as well as software required (e.g., the OS 194, IPMI applications) on the test machine 280.

In certain configurations, the testing platform 204 may generate a test script 282, which includes all information in the test pass 240. The test script 282, when executing by a test device, can cause the tester device to install the BMC firmware 106 on a BMC of the test machine 280 and to install other required software on a host of the test machine 280. Further, under the instruction of the test script 282, the tester device can run test procedures specified in each of the test cases of the test pass 240 upon the test machine to test the feature components 138-1 to 138-3.

Figure 3:
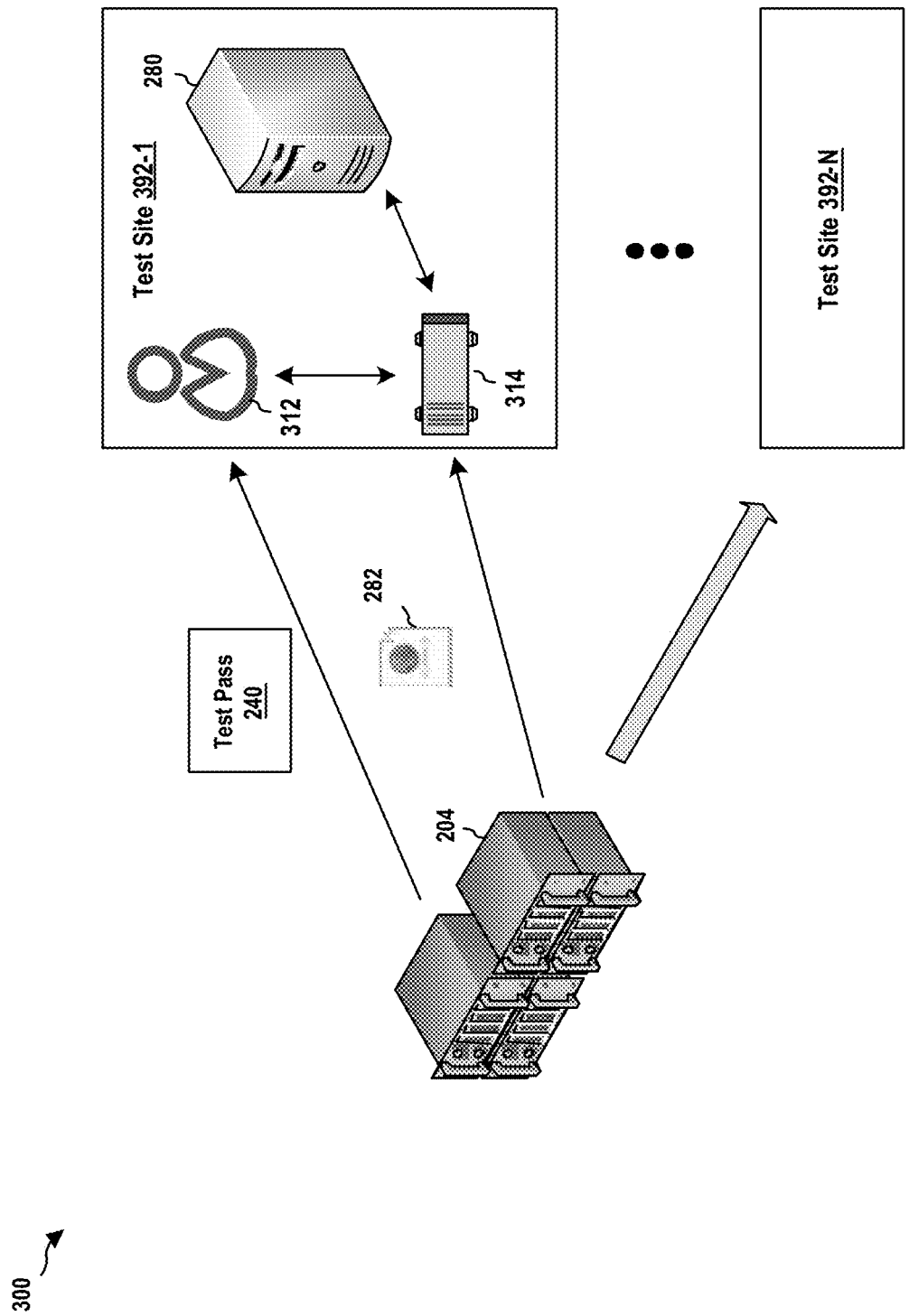
FIG. 3 is a diagram illustrating a firmware testing process.

FIG. 3 is a diagram illustrating a firmware testing process. The testing platform 204 may send the test pass 240 and/or test script 282 to one or more of test sites 392-1 to 392-N. Each of the test sites 392-1 to 392-N may have tester personnel 312 and a tester device 314. Once receiving the test pass 240 and/or test script 282 at a particular test site, a test machine 280 is selected or assembled at the test site, the BMC firmware 106 is loaded on the test machine 280, and the tests specified in the test pass 240 are run upon the test machine 280.

In one example, the testing platform 204 sends the test script 282 to the tester device 314 at the test site 392-1. The tester device 314 then executes the test script 282. Under the instructions of the test script 282, the tester device 314 can select a test machine 280 from a collection of available test machines based on the machine specification 236 included in the test script 282. The tester device 314 then install the BMC firmware 106, which has the new feature components 138-1 to 138-3, on the test machine 280. Further, the tester device 314 runs the test procedures specified by the test pass 240 to test the feature components 138-1 to 138-3. The tester device 314 generates test results based on the outcome of the test procedures.

In another example, the testing platform 204 sends the test pass 240 to the tester personnel 312. The tester personnel 312 may select or assemble a test machine 280 based on the machine specification 236 in the test pass 240. The tester personnel 312 further operates the tester device 314 to run the test procedures specified by the test pass 240 to test the feature components 138-1 to 138-3. The tester device 314 generates test results based on the outcome of the test procedures.

In certain configurations, the testing platform 204 may send different portions of the test cases listed in a test pass to different test sites. Accordingly, each test site only runs the test procedures listed in the corresponding portion of the test pass. For example, the testing platform 204 may send a test pass 240 or a test script 282 including only the test cases 230-1 and 230-2 to the test site 392-1. As such, only test procedures of the test cases 230-1 and 230-2 are run at the test site 392-1 on a test machine 280.

Figure 4:
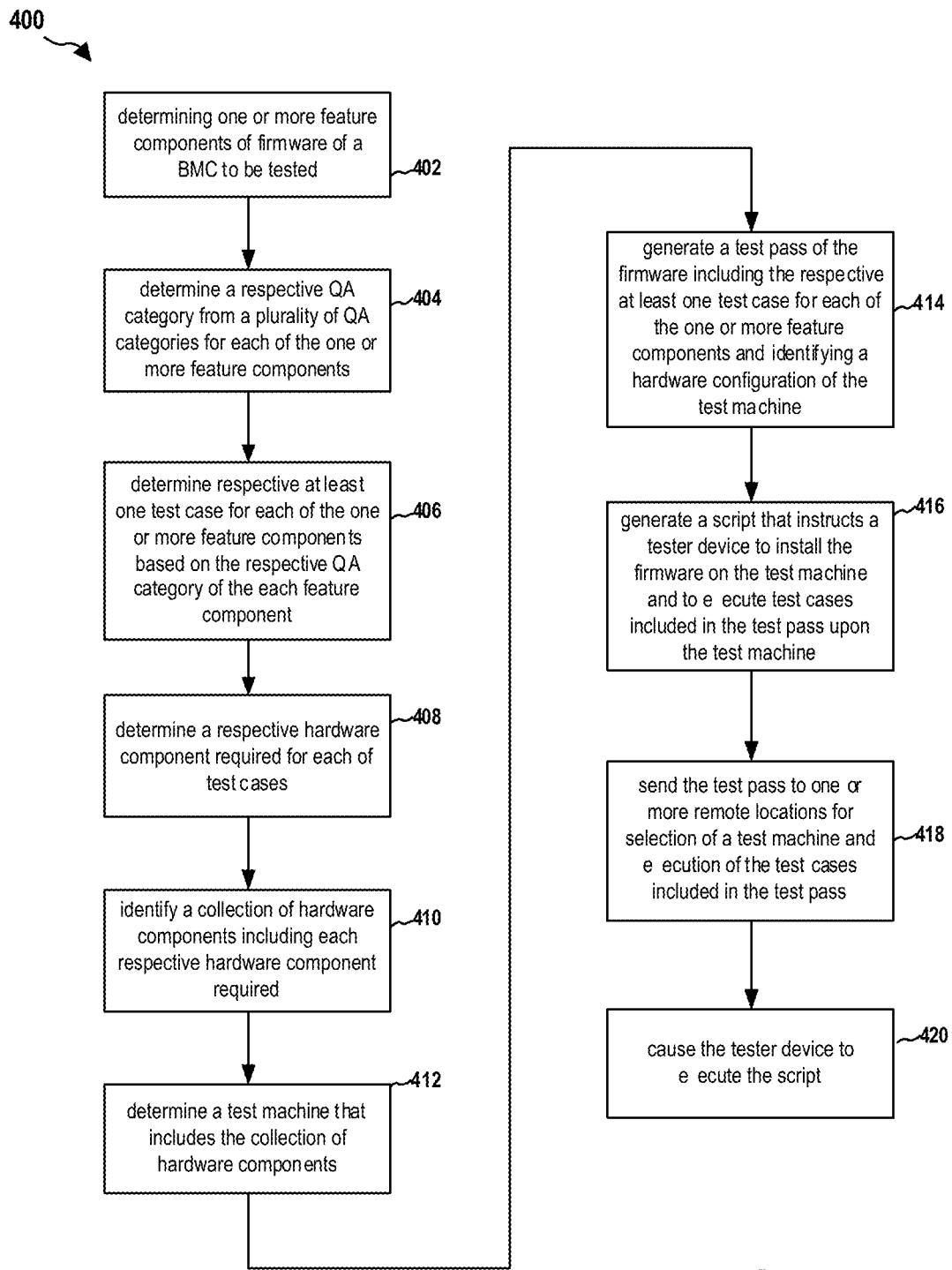
FIG. 4 is a flow chart of a method (process) for managing firmware tests.

FIG. 4 is a flow chart 400 of a method (process) for managing firmware tests. The method may be performed by a device (e.g., the testing platform 204, the apparatus 204'). At operation 402, the device determines one or more feature components (e.g., the feature components 138-1 to 138-3) of firmware (e.g., the BMC firmware 106) of a BMC (e.g., the BMC 102) to be tested. In certain configurations, the one or more feature components are determined from a collection of feature components based on a configuration of the firmware. At operation 404, the device determines a respective QA category from a plurality of QA categories (e.g., the QA categories 220-1 to 220-N) for each of the one or more feature components. Each of the plurality of QA categories is associated with a set of feature components and a set of the test cases (e.g., the test cases 230-1 to 230-3). At operation 406, the device determines respective at least one test case for each of the one or more feature components based on the respective QA category of the each feature component. The test case specifies hardware and a procedure to be used to test the each feature component.

At operation 408, the device determines a respective hardware component required for each of test cases. At operation 410, the device identifies a collection of hardware components including each respective hardware component required. At operation 412, the device determines a test machine (e.g., the test machine) that includes the collection of hardware components. The test pass further identifies a hardware configuration (e.g., the machine specification 236) of the test machine.

At operation 414, the device generates a test pass (e.g., the test pass 240) of the firmware including the respective at least one test case for each of the one or more feature components. At operation 416, the device generates a script (e.g., the test script 282) that instructs a tester device (e.g., the tester device 314) to install the firmware on the test machine and to execute test cases included in the test pass upon the test machine.

At operation 418, the device sends the test pass to one or more remote locations (e.g., the test sites 392-1 to 392-N) for selection of a test machine and execution of the test cases included in the test pass. In certain configurations, the one or more remote locations includes a first remote location and a second remote locations. A first subset of the test cases included in the test pass is executed on a test machine having the configuration identified by the test pass. A second subset of the test cases included in the test pass is executed on another test machine having the configuration identified by the test pass. At operation 420, the device causes the tester device to execute the script.

Figure 5:
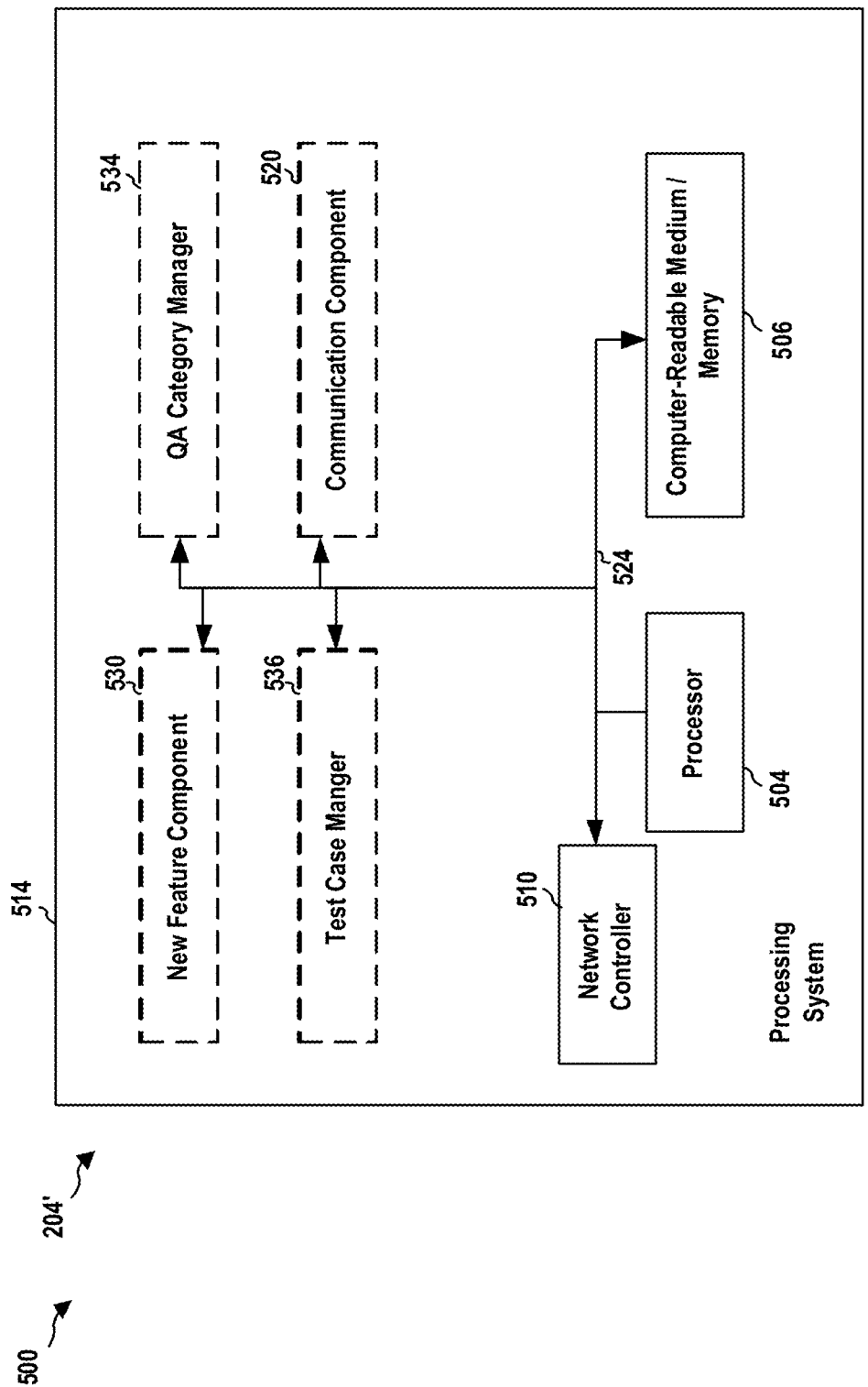
FIG. 5 is a diagram illustrating an example of a hardware implementation for an apparatus employing a processing system.

FIG. 5 is a diagram 500 illustrating an example of a hardware implementation for an apparatus 204' employing a processing system 514. The apparatus 204' may implement the testing platform 204. The processing system 514 may be implemented with a bus architecture, represented generally by the bus 524. The bus 524 may include any number of interconnecting buses and bridges depending on the specific application of the processing system 514 and the overall design constraints. The bus 524 links together various circuits including one or more processors and/or hardware components, represented by the processor 504, the computer-readable medium/memory 506, a network controller 510, etc.

The computer-readable medium/memory 506 may include the memory 114 and/or the storage 117. The bus 524 may also link various other circuits such as timing sources, peripherals, voltage regulators, and power management circuits, which are well known in the art, and therefore, will not be described any further.

The processing system 514 may be coupled to the network controller 510. The network controller 510 provides a means for communicating with various other apparatus over a network. The network controller 510 receives a signal from the network, extracts information from the received signal, and provides the extracted information to the processing system 514, specifically a communication component 520 of the apparatus 204'. In addition, the network controller 510 receives information from the processing system 514, specifically the communication component 520, and based on the received information, generates a signal to be sent to the network. The processing system 514 includes a processor 504 coupled to a computer-readable medium/memory 506. The processor 504 is responsible for general processing, including the execution of software stored on the computer-readable medium/memory 506. The software, when executed by the processor 504, causes the processing system 514 to perform the various functions described supra for any particular apparatus. The computer-readable medium/memory 506 may also be used for storing data that is manipulated by the processor 504 when executing software. The processing system further includes at least one of a new feature component 530, a QA category manager 534, and a test case manager 536. The components may be software components running in the processor 504, resident/stored in the computer readable medium/memory 506, one or more hardware components coupled to the processor 504, or some combination thereof.

The apparatus 204' may be configured to include means for performing operations described supra referring to FIG. 4. The aforementioned means may be one or more of the aforementioned components of the apparatus 204 and/or the processing system 514 of the apparatus 204' configured to perform the functions recited by the aforementioned means. For example, the new feature component 530 determines one or more feature components of firmware of a BMC to be tested. The QA category manager 534 determines a respective QA category from a plurality of QA categories for each of the one or more feature components. Each of the plurality of QA categories is associated with a set of feature components and a set of the test cases. The test case manager 536 determines respective at least one test case for each of the one or more feature components based on the respective QA category of the each feature component. The test case specifies hardware and a procedure to be used to test the each feature component.

Figure 6:
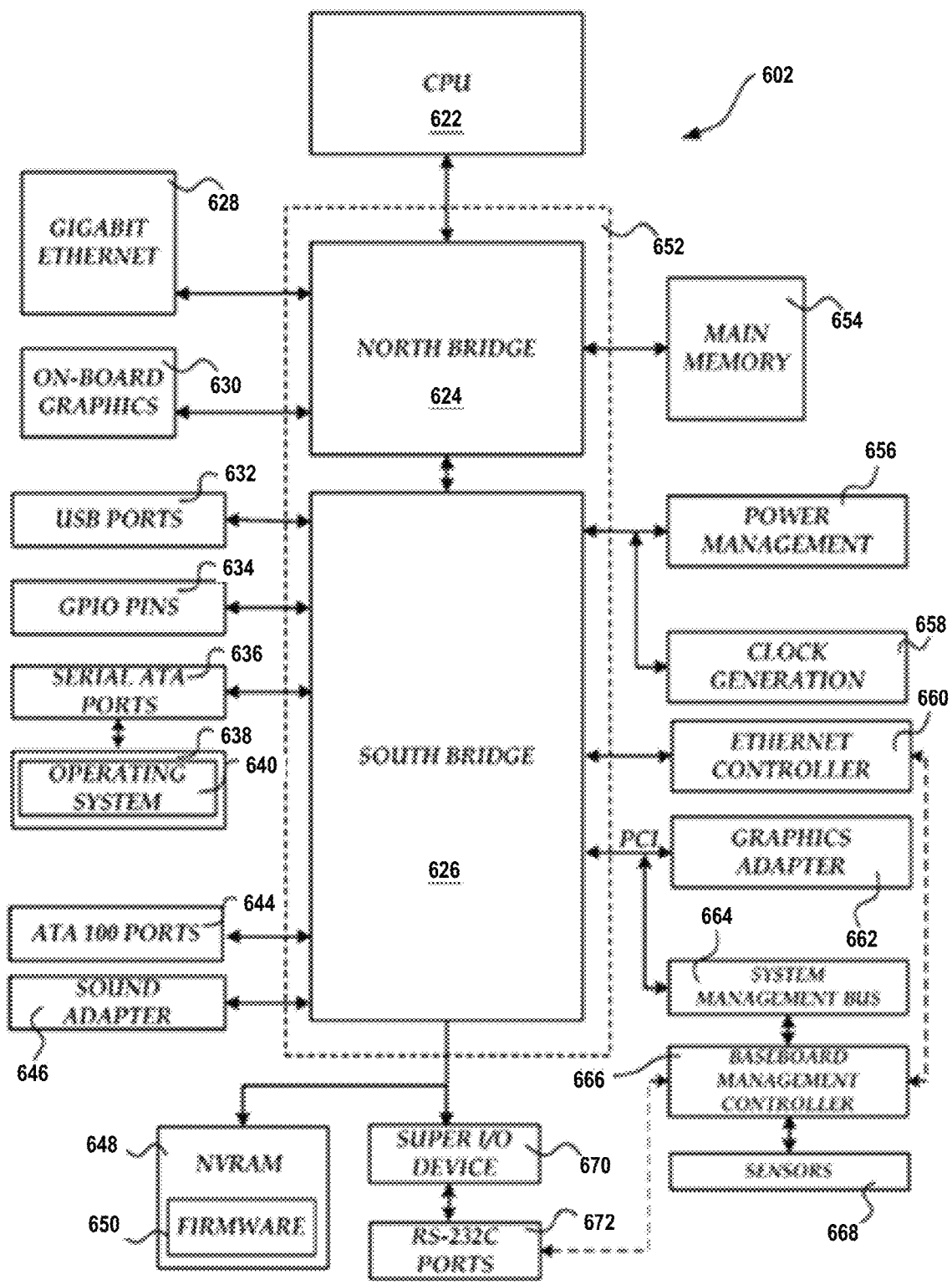
FIG. 6 shows a computer architecture for a computer.

FIG. 6 and the following discussion are intended to provide a brief, general description of one suitable computing environment in which aspects of the embodiments described herein may be implemented. In particular, FIG. 6 shows a computer architecture for a computer 602 that may be utilized to embody the host computer 180, as described supra. It should be appreciated that the computer architecture shown in FIG. 6 is merely illustrative and that other types of computers and computing devices may also be utilized to implement aspects of the embodiments presented herein.

While aspects presented herein include computer programs that execute in conjunction with the execution of an operating system, those skilled in the art will recognize that the embodiments may also be implemented in combination with other program modules and/or hardware devices. As described herein, computer programs include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

The computer 602 shown in FIG. 6 includes a baseboard, or "motherboard," which is a printed circuit board to which a multitude of components or devices may be connected by way of a system bus or other electrical communication path. In one illustrative embodiment, a CPU 622 operates in conjunction with a chipset 652. The CPU 622 is a standard central processor that performs arithmetic and logical operations necessary for the operation of the computer. The server computer 602 may include a multitude of CPUs 622.

The chipset 652 includes a north bridge 624 and a south bridge 626. The north bridge 624 provides an interface between the CPU 622 and the remainder of the computer 602. The north bridge 624 also provides an interface to a random access memory ("RAM") used as the main memory 654 in the computer 602 and, possibly, to an on-board graphics adapter 630. The north bridge 624 may also include functionality for providing networking functionality through a gigabit Ethernet adapter 628. The gigabit Ethernet adapter 628 is capable of connecting the computer 602 to another computer via a network. Connections which may be made by the network adapter 628 may include LAN or WAN connections. LAN and WAN networking environments are commonplace in offices, enterprise-wide computer networks, intranets, and the internet. The north bridge 624 is connected to the south bridge 626.

The south bridge 626 is responsible for controlling many of the input/output functions of the computer 602. In particular, the south bridge 626 may provide one or more USB ports 632, a sound adapter 646, an Ethernet controller 660, and one or more GPIO pins 634. The south bridge 626 may also provide a bus for interfacing peripheral card devices such as a graphics adapter 662. In one embodiment, the bus comprises a PCI bus. The south bridge 626 may also provide a system management bus 664 for use in managing the various components of the computer 602. Additional details regarding the operation of the system management bus 664 and its connected components are provided below.

The south bridge 626 is also operative to provide one or more interfaces for connecting mass storage devices to the computer 602. For instance, according to an embodiment, the south bridge 626 includes a serial advanced technology attachment ("SATA") adapter for providing one or more SATA ports 636 and an ATA 100 adapter for providing one or more ATA 100 ports 644. The SATA ports 636 and the ATA 100 ports 644 may be, in turn, connected to one or more mass storage devices such as the SATA disk drive 638 storing an operating system 640 and application programs.

As known to those skilled in the art, an operating system 640 comprises a set of programs that control operations of a computer and allocation of resources. An application program is software that runs on top of the operating system software, or other runtime environment, and uses computer resources to perform application specific tasks desired by the user. According to one embodiment of the invention, the operating system 640 comprises the LINUX operating system. According to another embodiment of the invention the operating system 640 comprises an operating system within the WINDOWS family of operating systems from MICROSOFT CORPORATION. According to another embodiment, the operating system 640 comprises the UNIX, LINUX, or SOLARIS operating system. It should be appreciated that other operating systems may also be utilized.

The mass storage devices connected to the south bridge 626, and their associated computer storage media, provide non-volatile storage for the computer 602. Although the description of computer storage media contained herein refers to a mass storage device, such as a hard disk or CD-ROM drive, it should be appreciated by those skilled in the art that computer storage media can be any available media that can be accessed by the computer 602.

By way of example, and not limitation, computer storage media may comprise volatile and non-volatile, removable and non-removable media implemented in any method or technology for storage of information such as computer-readable instructions, data structures, program modules or other data. Computer storage media also includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

According to embodiments, a low pin count ("LPC") interface may also be provided by the south bridge 626 for connecting a "Super I/O" device 670. The Super I/O device 670 is responsible for providing a number of input/output ports, including a keyboard port, a mouse port, a serial interface 672, a parallel port, and other types of input/output ports. The LPC interface may also connect a computer storage media such as a ROM or a flash memory such as a NVRAM 648 for storing the firmware 650 that includes program code containing the basic routines that help to start up the computer 602 and to transfer information between elements within the computer 602.

As described briefly above, the south bridge 626 may include a system management bus 664. The system management bus 664 may include a BMC 666. The BMC 666 may be the BMC 102. In general, the BMC 666 is a microcontroller that monitors operation of the computer system 602. In a more specific embodiment, the BMC 666 monitors health-related aspects associated with the computer system 602, such as, but not limited to, the temperature of one or more components of the computer system 602, speed of rotational components (e.g., spindle motor, CPU Fan, etc.) within the system, the voltage across or applied to one or more components within the system 602, and the available or used capacity of memory devices within the system 602. To accomplish these monitoring functions, the BMC 666 is communicatively connected to one or more components by way of the management bus 664. In an embodiment, these components include sensor devices 668 for measuring various operating and performance-related parameters within the computer system 602. The sensor devices 668 may be either hardware or software based components configured or programmed to measure or detect one or more of the various operating and performance-related parameters.

It should also be appreciated that the computer 602 may comprise other types of computing devices, including handheld computers, embedded computer systems, personal digital assistants, and other types of computing devices known to those skilled in the art. It is also contemplated that the computer 602 may not include all of the components shown in FIG. 6, may include other components that are not explicitly shown in FIG. 6, or may utilize an architecture completely different than that shown in FIG. 6.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of operating a computer system, comprising:
   determining, at a testing platform, one or more feature components of firmware of a baseboard management controller (BMC) to be tested;
   determining a respective quality assurance (QA) category from a plurality of QA categories for each of the one or more feature components, wherein each of the plurality of QA categories is associated with a set of feature components and a set of test cases;
   determining respective at least one test case for each of the one or more feature components based on the respective QA category of the each feature component, wherein the respective at least one test case specifies hardware and a procedure to be used to test the each feature component;
   generating a test pass of the firmware including the respective at least one test case for each of the one or more feature components;
   determining a respective hardware component required for each of test cases in the test pass;
   identifying the collection of hardware components including each respective hardware component required; and
   determining a specific hardware configuration corresponding to the collection of hardware components, wherein the test pass further identifies the hardware configuration;
   selecting a test site from a plurality of test sites each having a respective tester device;
   generating, at the testing platform, a script that includes the specific hardware configuration for selecting the test machine and that instructs a tester device of the selected test site to install the firmware on the test machine and to execute the one or more of the respective test cases upon the test machine;
   sending the script from the test platform to the tester device;
   selecting, at the tester device and in response to receiving the script, the test machine from a collection of available test machines and for receiving tests associated with the one or more of the respective test cases;
   assembling the test machine at the selected test site, the test machine implementing the specific hardware configuration and being installed firmware of a baseboard management controller (BMC), the tester device testing the firmware of BMC installed on the test machine; and
   executing the script at the tester device such that the firmware of the BMC installed on the test machine is being tested and receives the tests associated with the one or more of the respective test cases.

2. The method of claim 1, wherein the one or more feature components are determined from a collection of feature components based on a configuration of the firmware.

3. The method of claim 1, further comprising: sending the test pass to one or more remote locations for selection of a test machine and execution of test cases included in the test pass.

4. The method of claim 3, wherein the one or more remote locations includes a first remote location and a second remote locations, wherein a first subset of the test cases included in the test pass is executed on a test machine having the hardware configuration identified by the test pass, wherein a second subset of the test cases included in the test pass is executed on another test machine having the hardware configuration identified by the test pass.

5. An apparatus, comprising:
a memory; and
at least one processor coupled to the memory and configured to:
determine, at a testing platform, one or more feature components of firmware of a baseboard management controller (BMC) to be tested;
determine a respective quality assurance (QA) category from a plurality of QA categories for each of the one or more feature components, wherein each of the plurality of QA categories is associated with a set of feature components and a set of the test cases;
determine respective at least one test case for each of the one or more feature components based on the respective QA category of the each feature component, wherein the respective at least one test case specifies hardware and a procedure to be used to test the each feature component;
generate a test pass of the firmware including the respective at least one test case for each of the one or more feature components;
determine a respective hardware component required for each of test cases in the test pass;
identify the collection of hardware components including each respective hardware component required; and
determine a specific hardware configuration corresponding to the collection of hardware components, wherein the test pass further identifies the hardware configuration;
select a test site from a plurality of test sites each having a respective tester device;
generate, at the testing platform, a script that includes the specific hardware configuration for selecting the test machine and that instructs a tester device to install the firmware on the test machine and to execute the one or more of the respective test cases upon the test machine;
send the script from the test platform to the tester device;
select, at the tester device and in response to receiving the script, the test machine from a collection of available test machines and for receiving tests associated with the one or more of the respective test cases;
assemble the test machine at the selected test site, the test machine implementing the specific hardware configuration and being installed firmware of baseboard management controller (BMC), the tester device testing the firmware of BMC installed on the test machine; and
execute the script at the tester device such that the firmware of the BMC installed on the test machine is being tested and receives the tests associated with the one or more of the respective test cases.

6. The apparatus of claim 5, wherein the one or more feature components are determined from a collection of feature components based on a configuration of the firmware.

7. The apparatus of claim 5, wherein the at least one processor is further configured to: send the test pass to one or more remote locations for selection of a test machine and execution of the test cases included in the test pass.

8. The apparatus of claim 7, wherein the one or more remote locations includes a first remote location and a second remote locations, wherein a first subset of the test cases included in the test pass is executed on a test machine having the hardware configuration identified by the test pass, wherein a second subset of the test cases included in the test pass is executed on another test machine having the hardware configuration identified by the test pass.

9. A non-transitory computer-readable medium storing computer executable code for operating a testing platform, comprising code to:
determine one or more feature components of firmware of a baseboard management controller (BMC) to be tested;
determine a respective quality assurance (QA) category from a plurality of QA categories for each of the one or more feature components, wherein each of the plurality of QA categories is associated with a set of feature components and a set of the test cases;
determine respective at least one test case for each of the one or more feature components based on the respective QA category of the each feature component, wherein the respective at least one test case specifies hardware and a procedure to be used to test the each feature component;
generate a test pass of the firmware including the respective at least one test case for each of the one or more feature components;
determine a respective hardware component required for each of test cases in the test pass;
identify the collection of hardware components including each respective hardware component required; and
determine a specific hardware configuration corresponding to the collection of hardware components, wherein the test pass further identifies the hardware configuration;
select a test site from a plurality of test sites each having a respective tester device;
generate, at the testing platform, a script that includes the specific hardware configuration for selecting the test machine and that instructs a tester device to install the firmware on the test machine and to execute the one or more of the respective test cases upon the test machine;
send the script from the test platform to the tester device;
select, at the tester device and in response to receiving the script, the test machine from a collection of available test machines and for receiving tests associated with the one or more of the respective test cases;
assemble the test machine at the selected test site, the test machine implementing the specific hardware configuration and being installed firmware of a baseboard management controller (BMC), the tester device testing the firmware of BMC installed on the test machine; and execute the script at the tester device such that the firmware of the BMC installed on the test machine is being tested and receives the tests associated with the one or more of the respective test cases.

10. The non-transitory computer-readable medium of claim 9, wherein the one or more feature components are determined from a collection of feature components based on a configuration of the firmware.

11. The non-transitory computer-readable medium of claim 9, wherein the code is further configured to: send the test pass to one or more remote locations for selection of a test machine and execution of the test cases included in the test pass.

* * * * *